United States Patent
Ko et al.

(10) Patent No.: US 8,724,732 B2
(45) Date of Patent: May 13, 2014

(54) SYSTEM AND METHOD FOR THE COOPERATION AMONG BASE STATIONS

(75) Inventors: Eun Seok Ko, Seongnam-si (KR); Eun Yong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 13/255,766

(22) PCT Filed: Mar. 9, 2010

(86) PCT No.: PCT/KR2010/001469
§ 371 (c)(1),
(2), (4) Date: Sep. 9, 2011

(87) PCT Pub. No.: WO2010/104319
PCT Pub. Date: Sep. 16, 2010

(65) Prior Publication Data
US 2012/0002745 A1    Jan. 5, 2012

(30) Foreign Application Priority Data
Mar. 10, 2009  (KR) .......................... 10-2009-0020099

(51) Int. Cl.
*H04B 15/00*    (2006.01)
(52) U.S. Cl.
USPC ........................................................ 375/285
(58) Field of Classification Search
CPC .................................................. H04B 7/0639
USPC ......... 370/329, 330, 331, 332, 333, 335, 350, 370/410, 511, 513, 479; 455/450, 452, 453, 455/133–135; 375/346–347
See application file for complete search history.

(56) References Cited

U.S. PATENT DOCUMENTS

| 7,372,912 B2* | 5/2008 | Seo et al. ...................... 375/267 |
| 7,839,842 B2* | 11/2010 | Zhang et al. .................. 370/380 |
| 8,488,704 B2* | 7/2013 | Zhang et al. .................. 375/267 |
| 2008/0043867 A1 | 2/2008 | Blanz et al. |
| 2008/0089286 A1 | 4/2008 | Malladi et al. |
| 2008/0225965 A1 | 9/2008 | Pi et al. |
| 2008/0233902 A1* | 9/2008 | Pan et al. .................... 455/114.3 |

* cited by examiner

*Primary Examiner* — Hanh N Nguyen
(74) *Attorney, Agent, or Firm* — Jefferson IP Law, LLP (57) ABSTRACT

The present invention relates to a system and to a method for the cooperation among base stations, in which a communication service is provided to a plurality of communication terminals through the plurality of base stations. When channel state information of a communication terminal is acquired, a serving base station selects a serving channel code matching the channel state information from a codebook, calculates linear transform information using the serving channel code and the channel state information, and transmits the serving channel code to a cooperative base station. When the cooperative base station receives a cooperation channel code, the serving base station calculates serving weight information of the serving base station and cooperation weight information of the cooperative base station using the serving channel code and the cooperation channel code, and determines a beam forming vector by applying the linear transform information to the serving weight information. According to the present invention, the channel state information is linearly transformed before the base station transforms the channel state information into the channel code, to thereby predict a quantization loss between the channel state information and the channel code in the system for the cooperation among base stations. In addition, the base station may recover the quantization loss when communication service is provided in the system for the cooperation among base stations. This leads to improved cooperation performance among base stations in the system for the cooperation among base stations.

17 Claims, 5 Drawing Sheets

SYSTEM AND METHOD FOR THE COOPERATION AMONG BASE STATIONS

BACKGROUND OF THE INVENTION

1. Field of the Invention

The present invention relates to a communication system and method and, in particular, to a base station cooperation system and method for providing a plurality of mobile stations with a communication service through cooperation among a plurality of base stations.

2. Description of the Related Art

Typically, a communication is designed to provided communication services including voice and various multimedia services. In order to meet the high quality and high data rate requirements for multimedia services, recent communication systems employ Multiple Input Multiple Output (MIMO) technique. With the use of multiple antennas, it is possible to increase the channel capacity in the limited channel resource and thus provide high speed communication service.

Such a communication system is composed of a plurality cells neighboring with each other. The communication system includes a plurality of Base Stations (BS) for controlling their respective cells and a plurality of Mobile Stations (BS) that connect to one of the BSs to receive the communication service. In the communication between BS and MS, inter-cell interference may occurs at the cell boundary. This is because that the MS located at the cell boundary region receives the signals transmitted by a plurality of MSs. That is, the signals transmitted by the neighbor BSs can influence the MS as interferences. Accordingly, the MS experiences performance degradation at the cell boundary region.

In order to mitigate the inter-cell interference, various technique of cooperation among the BSs are being proposed. In such a communication system, the BSs share the channel information such that each BS can restrict or recommend the use of specific channel information. Through the cooperation among the BSs, it is possible to reduce the inter cell interference at the MSs. Each BS acquires Channel State Information (CSI) of the MS, selects a channel code from a previously stored codebook in match with the CSI, and sends the channel code to other BSs to share the channel information. Typically, the BS quantizes the analog channel state into a channel code which is transmitted.

SUMMARY OF THE INVENTION

Problem to be Solved

In the conventional communication system, however, when the channel state information is converted into the channel code, the quantization loss occurs between the channel state information and the channel code. The quantize loss causes BS cooperation performance degradation.

Means for Solving the Problem

In order to solve the above problem, the present invention provides a BS cooperation system for providing a plurality of MSs with the communication service in cooperation among a plurality of BSs.

In accordance with an aspect of the present invention, a base station cooperation system for providing a plurality of mobile stations with communication service through a plurality of base stations includes a serving base station which provides a mobile station with communication service and at least one cooperating base station neighboring with the serving base station, wherein the serving base station includes a radio communication unit which acquires channel state information of the mobile station, a linear transformer which selects, when the channel state information is acquired, a serving channel code corresponding to the channel state information and produces linear transformation information using the serving channel code and the channel state information, a memory which stores a codebook having the serving channel code, and a control unit which transmits the serving channel code to the cooperating base station, producing, when cooperating channel code is received from the cooperating base station, serving weight information of the serving base station and cooperating weight information of the cooperating base station using the serving channel code and cooperating channel code and determines a beamforming vector by applying the linear transformation information to the serving weight information.

In accordance with another aspect of the present invention, a base station cooperation system for providing a plurality of mobile stations with communication service through a plurality of base stations includes a plurality of base stations which select, when channel state information of a mobile station, a channel code corresponding to the channel state information, produce linear transformation information using the selected channel code and the channel state information, and transmit the selected channel code; and a coordinator which produce, when the channel code is received from the base stations, weight information per base station using the channel code and transmits the weight information to corresponding base station, wherein the base station determines, when the weight information is received, a beamforming vector by applying the linear transformation information to the weight vector.

In order to solve the above problem, the present invention provides a BS cooperation method for providing a plurality of MSs with the communication service in cooperation among a plurality of BSs.

In accordance with another aspect of the present invention, a base station cooperation method for providing a plurality of mobile stations with communication service through a plurality of base stations includes selecting, at a serving base station when channel state information of a mobile station is acquired, a serving channel code corresponding to the channel state information from a codebook; producing linear transformation information using the serving channel code and the channel state information; producing, when a cooperating channel code is received from a cooperating base station, serving weight information of the serving base station and cooperating weight information of the cooperating base station using the serving channel code and the cooperating channel code; and determining a beamforming vector by applying the linear transformation information to the serving weight information.

In accordance with still another aspect of the present invention, a base station cooperation method for providing a plurality of mobile stations with communication service through a plurality of, base stations includes selecting, at a base station when channel state information of a mobile station is acquired, a channel code corresponding to the channel state information from a codebook; producing linear transformation information using the selected channel code and the channel state information; transmitting the selected channel code to a coordinator; transmitting, at the coordinator when the channel is received, weight information per base station produced using the received channel code to the base station; and determining, at the base station when the weight information is received, a beamforming vector by applying the linear transformation information to the weight information.

Advantageous Effects

The BS cooperation system and method of the present invention enables the BE to produce linear transformation information that is capable of minimizing the quantization loss between the channel state information and the channel code. In the BS cooperation system of the present invention, the BS uses the linear transformation information for beamforming to recover the quantization loss. With the quantization loss recovery, it is possible to improve the cooperation performance of the BS cooperation system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
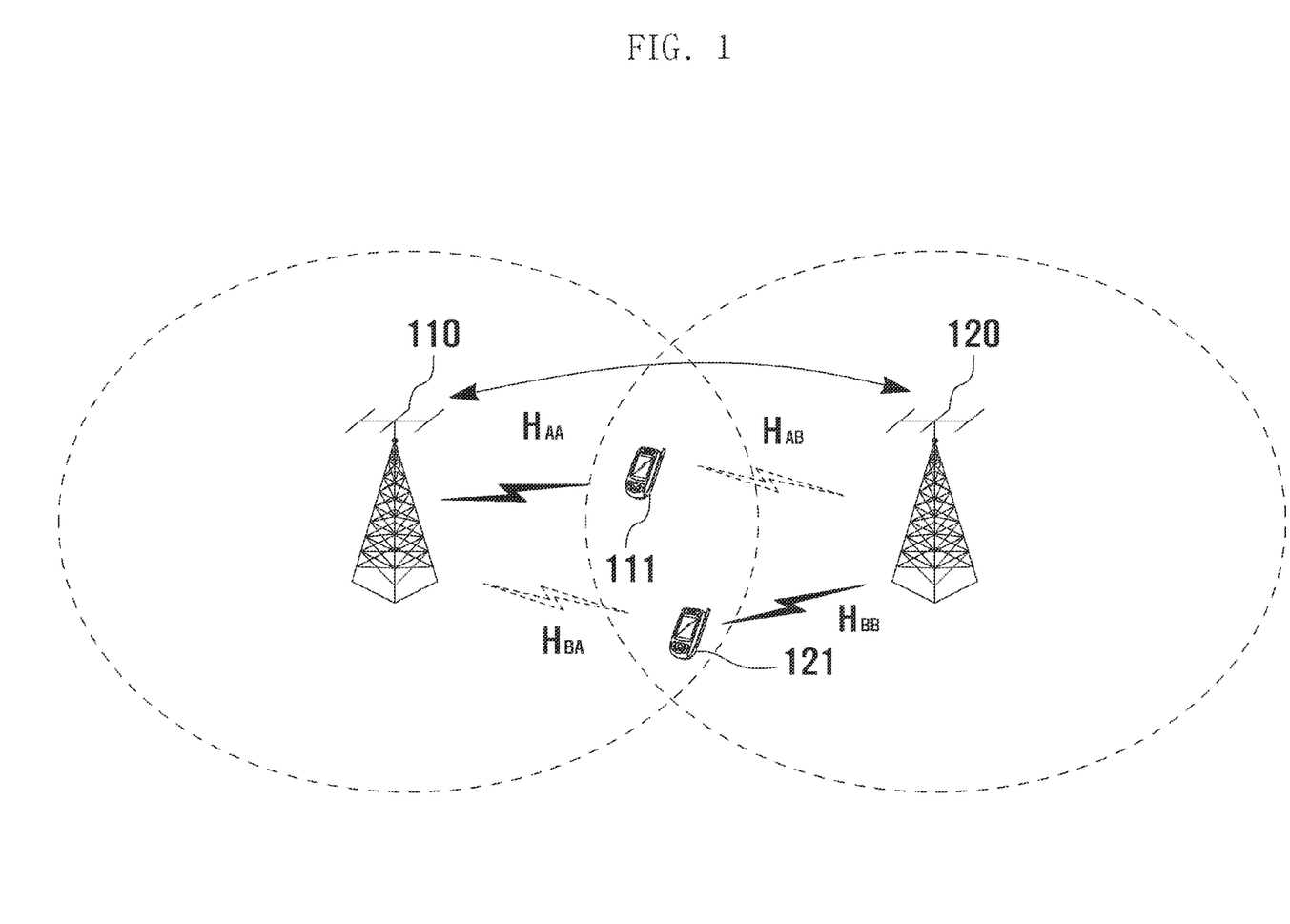
FIG. 1 is a diagram illustrating architecture of the BS cooperation system according to an embodiment of the present invention.

FIG. 1 is a diagram illustrating architecture of the BS cooperation system according to an embodiment of the present invention. Although the description is directed to the BS cooperation system implemented with a MIMO technique, the present invention is not limited thereto.

Referring to FIG. 1, the BS cooperation system of this embodiment includes a plurality of cells. Here, some of the cells are neighboring with each other. The BS cooperation system includes a plurality of BSs 110 and 120 for controlling the respective sells. The BSs 110 and 120 provide the MSs with the communication service within their respective cells.

Each of the BSs can be the serving BS ($B_{SA}$) 110 and simultaneously a cooperating BS ($B_{SB}$) 120 cooperating with other BSs. Each of the MSs can be a serving MS ($M_{SA}$) connected to the serving BS 110 to receive the communication and simultaneously a cooperation MS ($M_{SB}$) 121 connected to the cooperating BS 120 to receive the communication service. That is, the serving BS 110 and the cooperating BS 120 cooperate with each other to suppress the inter-cell interference to the serving and cooperating MSs 111 and 121.

In the BS cooperation system, the serving and cooperating MSs 111 and 121 can be located at the cell boundary of the serving and cooperating BSs 110 and 120. The serving and cooperating MSs 111 and 121 can receive the signals transmitted by the serving and cooperating BSs 110 and 120. At this time, the serving BS 110 can transmit a signal to the serving MS 111 with a specific channel state information, e.g. $H_{AA}$, and to the cooperating MS 121 with another specific channel state information, e.g. $H_{BA}$. Also, the cooperating BS 120 can transmit a signal to the serving MS 111 with a specific channel state information, e.g., $H_{AB}$, and to the cooperating MS 121 with a specific channel state information, e.g. $H_{BB}$.

Each of the serving and cooperating MSs 111 and 121 checks the channel state information and feeds back to the serving and cooperating BSs 110 and 120. That is, the serving MS 111 can discriminate between $H_{AA}$ and $H_{AB}$. The serving MS 111 can feed back the $H_{AA}$ and $H_{AB}$ to the serving BS 110 or $H_{AA}$ to the serving BS 110 and $H_{AB}$ to the cooperating BS 120. Likewise, the cooperating MS 121 can discriminate between HBA and HBB. Also, the cooperating MS 121 can feed back HBA and HBB to the serving BS 110 or HBA to the serving BS 110 and HBB to the cooperating bas 120. When the channel state information of the serving and cooperating MSs 111 and 121 are received, the serving and cooperating BSs 110 and 120 share the channel state information of the serving and cooperating MSs 111 and 121 via backhaul to cooperate with each other.

Figure 2:
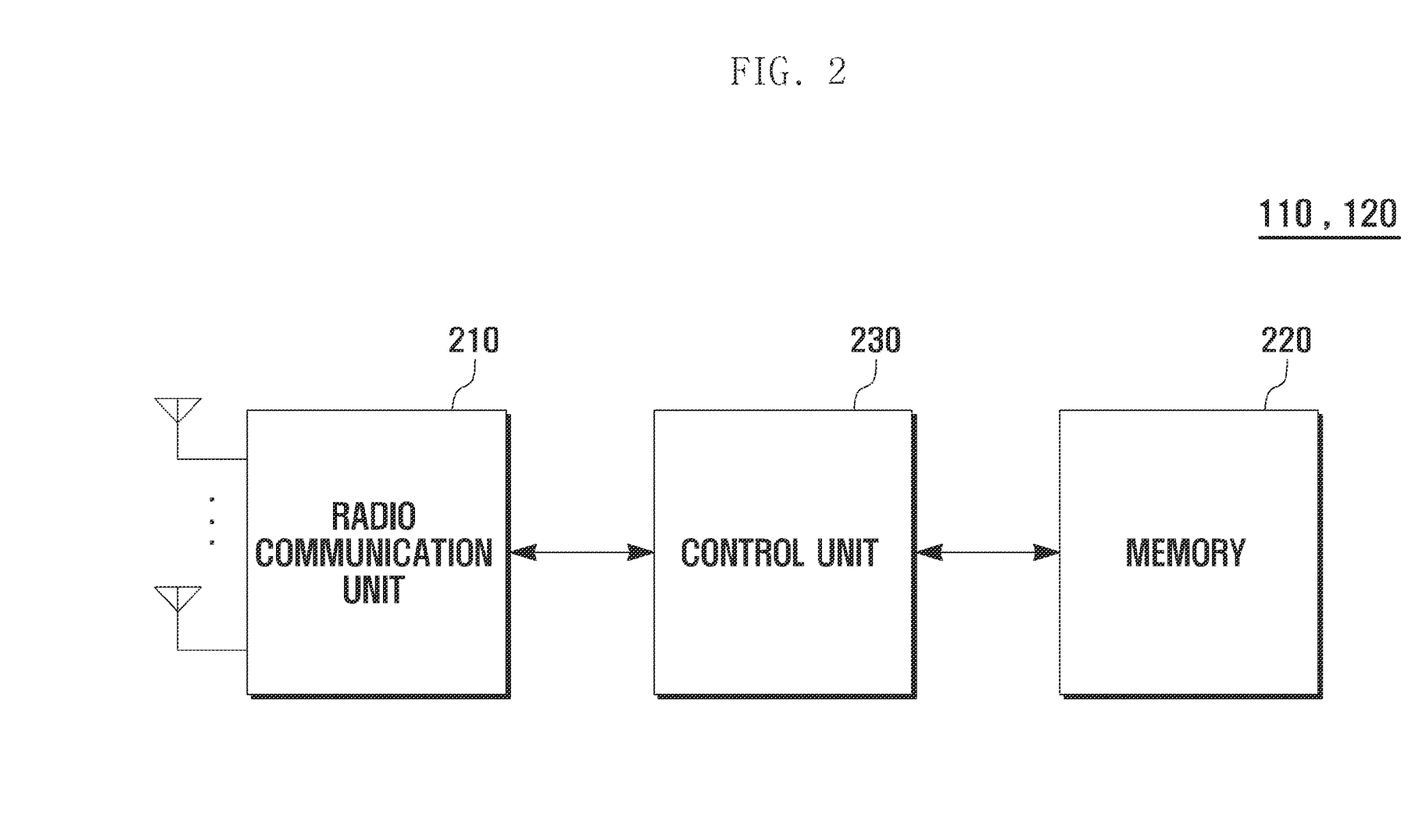
FIG. 2 is a block diagram illustrating a configuration of the base station of FIG. 1.

FIG. 2 is a block diagram illustrating a configuration of the base station 110 and 120 of FIG. 1.

Referring to FIG. 2, the base station is provided with a radio communication unit 210, a control unit 220, and a memory 230.

The radio communication unit 210 is responsible for the communication function of the base station. The radio communication unit 210 includes a receiver for up-converting and amplifying the transmit signal and a receiver for low noise amplifying and down-converting the receive signal. The radio communication unit 210 can receive the channel state information of the MSs 111 and 121 according to an embodiment of the present invention.

The memory 220 can include program and data memories. The program memory stores the programs for controlling general operations of the base station. The program memory can store the program related to the cooperation between BSs 110 and 120. The data memory store the data generated while the programs are running. The memory 220 stores a codebook composed of a plurality of channels code according to an embodiment of the present invention.

The control unit is responsible for controlling overall operations of the BS. The control unit 230 includes a data processing unit having a transmitter for encoding and modulating the transmit signal and a receiver for demodulating and decoding the receive signal. Here, the data processing unit can include a modem and a codec. The codec is provided with a data codec for processing packet data and an audio codec for processing audio signal including voice.

The control unit 230 acquires the channel state information of the MSs 111 and 121 by means of the radio communication unit 210 according to an embodiment of the present invention. The control unit 230 selects the channel code corresponding to the channel state information from the codebook stored in the memory 220 according to an embodiment of the present invention. the control unit 230 includes a linear transformer (not shown) for producing linear transformation information using the channel state information and the channel code according to an embodiment of the present invention. Also, the control unit 230 transmits the channel code by means of the radio communication unit 210 according to an embodiment of the present invention. In this manner, the BSs 110 and 120 can share the channels codes. Here, the channel code transmitted by the BS can be referred to as serving channel code. When the channel code is received by the radio communication unit 210, the control unit 230 produces weight information per BS according to an embodiment of the present invention. here, the channel code received at the BS can be referred to as a cooperating channel code. The control unit 230 determines a beamforming vector (beamforming matrix) by applying the linear transformation information to the weight information according to an embodiment of the present invention. In this manner, the control unit 230 provides the MSs 111 and 121 with the communication system using the beamforming vector according to an embodiment of the present invention.

Figure 3:
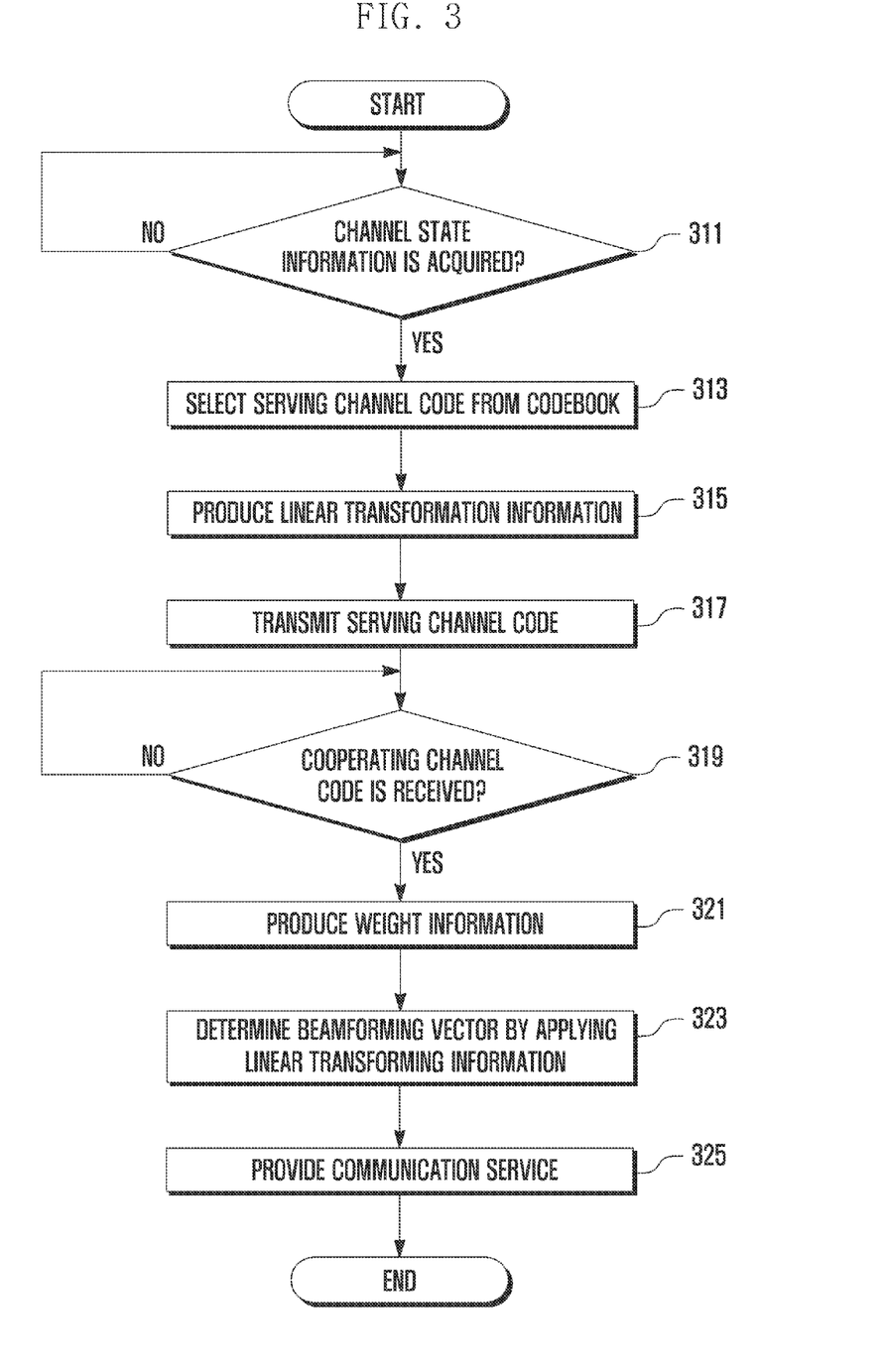
FIG. 3 is a flowchart illustrating the BS cooperation procedure according to an embodiment of the present invention.

FIG. 3 is a flowchart illustrating the BS cooperation procedure according to an embodiment of the present invention. In this embodiment, the base station cooperation procedure is performed through communication between the BSs 110 and 120. Here, each serving BS can be the serving BS and simultaneously the cooperating BS 120.

Referring to FIG. 3, in the BS cooperation procedure of this embodiment, the control unit 230 acquires the channel state information at step 311. At this time, the control unit can acquire the channel state information using the sounding technique or the analog feedback technique. For example, the control unit 230 of the serving BS 110 can acquire $H_{AA}$ and $H_{AB}$ from the serving MS 111. The control unit 230 of the serving BS 110 also can acquire the $H_{AA}$ from the serving MS 111 and $H_{BA}$ from the cooperating MS 121.

If the channel state information is received, the control unit 230 selects a serving channel code corresponding to the channel state information from the codebook at step 313. That is, the control unit 230 can select the channel code having the least difference to the channel state information among the channel codes of the codebook as the serving channel code. For example, the control unit 230 can selects $C_A$ corresponding to $H_A$. At this time, the control unit 230 can select the serving channel code using equation (1):

$$C_i(m') = \min_{C_i(m') \in C} \|H_i - C(m)\|^2 \quad (1)$$

Here, m denotes the index of channel code, C(m) denotes the channel code corresponding to m, i denotes the index of BS, $H_i$ denotes the channel state information, and $C_i(m')$ denotes the serving channel code. Hi denotes the integrated channel state information in association with at least one MS that can communicate with the BS. For example, $H_i$ of the serving BS 110 can be $[H_{AA}{}^T H_{BA}{}^T]^T$ and $H_i$ of the cooperating BS 120 can be $[H_{AA}{}^T H_{BA}{}^T]^T$. Here, T denotes the transpose of matrix.

Next, the control unit 230 produces the linear transformation, information unit the channel state information and the serving channel code at step 315. That is, the control unit 230 produces the linear transformation information to minimize the quantization loss between the channel state information and the serving channel code. At this time, the control unit 230 converts the channel state information and the serving channel code linearly to produce the linear transformation using equation (2). For example, the control unit 230 can produce the linear transformation information using equation (3). In this manner, the control unit 230 can quantize the channel state information into the serving channel code such that the quantization loss between the channel state information and the serving channel code with the linear transformation information.

$$F_i = \min \|H_i F_i - C_i(m') + \epsilon_i\|^2 \quad (2)$$

Here, $F_i$ denotes the linear transformation information, $H_i$ denotes the channel state information, $C_i(m')$ denotes the serving channel code, and $\epsilon_i$ denotes the channel state information error.

$$F_i = H_i^H H_i)^{-1} H_i^H \cdot C_i(m') \quad (3)$$

Here, $N_T$ denotes a number of transmit antennas of the BS, and $N_R$ denotes a number of receive antennas of the MS.

Next, the control unit 230 transmits the serving channel code to the cooperating BS 120 at step 317. If the cooperating channel code is received from the cooperating BS 120, the control unit 230 detects the receipt of the cooperating channel code at step 319 and produces the weight information of the serving and cooperating BSs 110 and 120 at step 321. For example, the control unit 230 can receive $C_B$ corresponding to $H_B$ from the cooperating BS 120. The control unit 230 produces the weight information of the serving BS, i.e. serving weight information and the weight information of the cooperating BS, i.e. cooperating weight information, using the serving and cooperating channel codes. For example, the control unit 230 can produce the serving and cooperating weight information using equation (4):

$$[C_A \quad C_B]^{-1} = \begin{bmatrix} W_A \\ W_B \end{bmatrix} \quad (4)$$

Here, $W_A$ denotes the serving weight information, and $W_B$ denotes the cooperating weight information.

Finally, the control unit 230 applies the linear transformation information to the serving weight information to determine the beamforming vector at step 323. That is, the control unit 230 applies the second linear transformation information to the serving weight information to produce the final weight information. At this time, the control unit 230 can produce the final weight information using equation (5). The control unit 230 determines the beamforming vector using the final weight information. Afterward, the control unit 230 provides the serving MS 111 with the communication service using the beamforming vector at step 325. In this manner, the control unit 230 can recover the quantization loss between the channel state information and the channel code.

$$W_i' = F_i \times W_i \quad (5)$$

Here, $W_i$ denotes the serving weight information, $F_i$ denotes the linear transformation information, and $W_i'$ denotes the final weight information.

Although the description is directed to the exemplary case where the BSs can communicate directly and the BS produce the per-BS weight information to determine the beamforming vector, the present invention is not limited thereto. that is, even when the direct communication between BSs is impossible, the present invention can be implemented. Such a case is described as another embodiment hereinafter.

Figure 4:
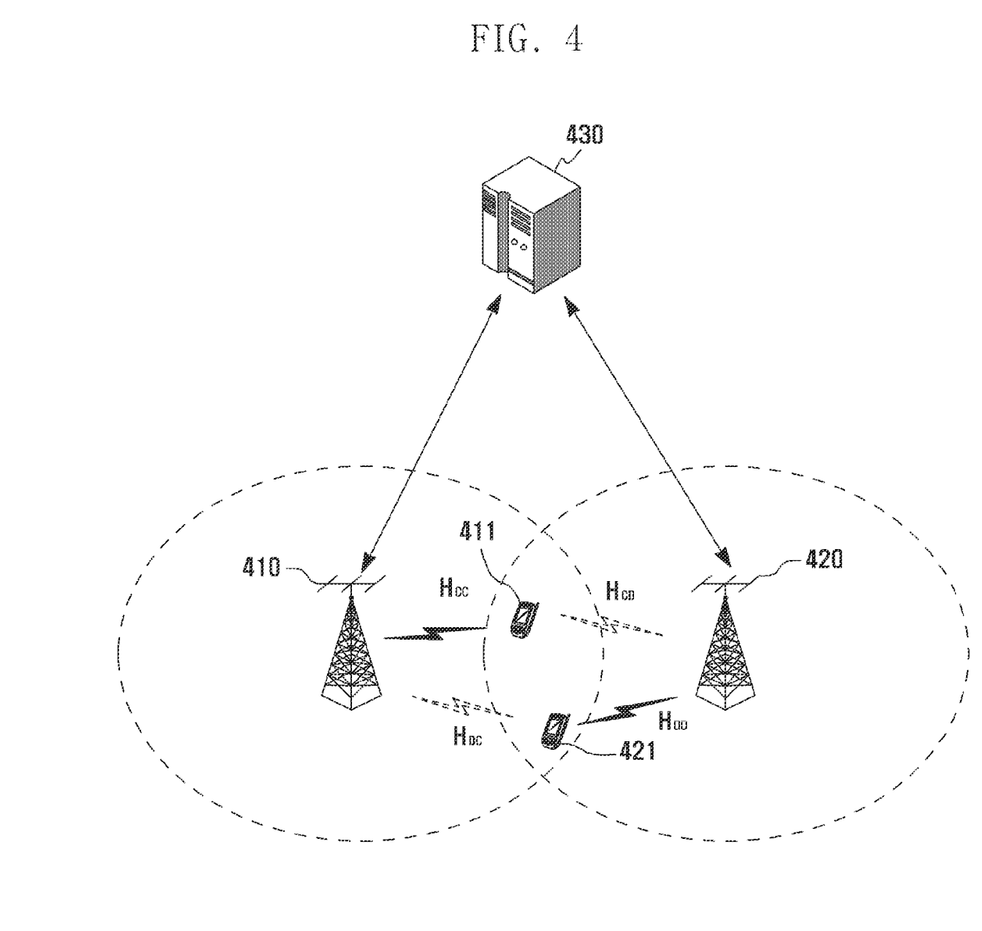
FIG. 4 is a diagram illustrating architecture of a BS cooperation system according to another embodiment of the present invention.

FIG. 4 is a diagram illustrating architecture of a BS cooperation system according to another embodiment of the present invention. Although the description is directed to the BS cooperating system implemented with MIMO, the present invention is not limited thereto.

Referring to FIG. 4, the BS cooperating system of this embodiment is composed of a plurality of cells. Some of the cells are neighboring with each other. The BS cooperation system includes a plurality of BSs 410 and 420 for controlling the respective cells and a coordinator 430 for relaying the communication between the BSs 410 and 420. The BSs 410 and 420 can communicate with each other via the coordinator 430. The base stations 410 and 420 provide the MSs 411 and 421 with the communication service within their respective cells.

At this time, each BS can be the serving BS ($BS_C$) 410 and simultaneously the cooperating BS ($BS_D$) 420 which cooperate with other BS. Each MS can be the serving MS ($MS_C$) 411 connected to the serving BS 410 for use of the communication service and simultaneously the cooperating MS ($MS_D$) 421 connected to the cooperating BS 420 for use of the communication service. That is, the serving and cooperating BSs 410 and 420 cooperate with each other to suppress the inter-cell interference at the serving and cooperation MSs 411 and 421.

In the BS cooperation system, the serving and cooperating MSs 411 and 421 can be located at the cell boundary of the serving and cooperating BSs 410 and 420. The serving BS 410 can transmit a signal to the serving MS 411 with specific channel state information, e.g. $H_{CC}$, and to the cooperating MS 421 with specific channel stat information, e.g. $H_{CD}$.

Each of the serving and cooperating MSs 411 and 421 can check the channel state information and feed back the check result to the serving and cooperating BSs 410 and 420. That is, the serving MS 411 can discriminate between $H_{CC}$ and $H_{CD}$. The serving MS 411 also can feed back the HCC and $H_{CD}$ to the serving BS 410 or $H_{CC}$ to the serving BS and $H_{CD}$ to the cooperating BS 420. Likewise, the cooperating MS 421 can discriminate between HDC and HDD. The cooperating MS 421 also can feed back HDC and HDD to the cooperating BS 420 or HDC to the serving BS 410 and HDD to the cooperating BS 420. In this manner, when the channel state information of the serving and cooperating MSs 411 and 421 are acquired, the serving and cooperating BSs 410 and 420 can share the channel state information of the serving and cooperating MSs 411 and 421 via the coordinator 430 to cooperate with each other.

Since the configuration of the BS according to this embodiment is similar to that of the above described embodiment, detailed description thereon is omitted herein. However, the BSs 410 and 420 of this embodiment do not share the channel codes directly but transmit the channel codes to the coordinator 430. If the per-BS weight information are received, each BS applies the linear transformation information to the weight information to determine the beamforming vector. The BSs 410 and 420 can provide the MSs 411 and 421 with the communication service using the beamforming vector. In this embodiment, it is not necessary for the BSs 410 and 420 to produce the per-BS weight information.

Figure 5:
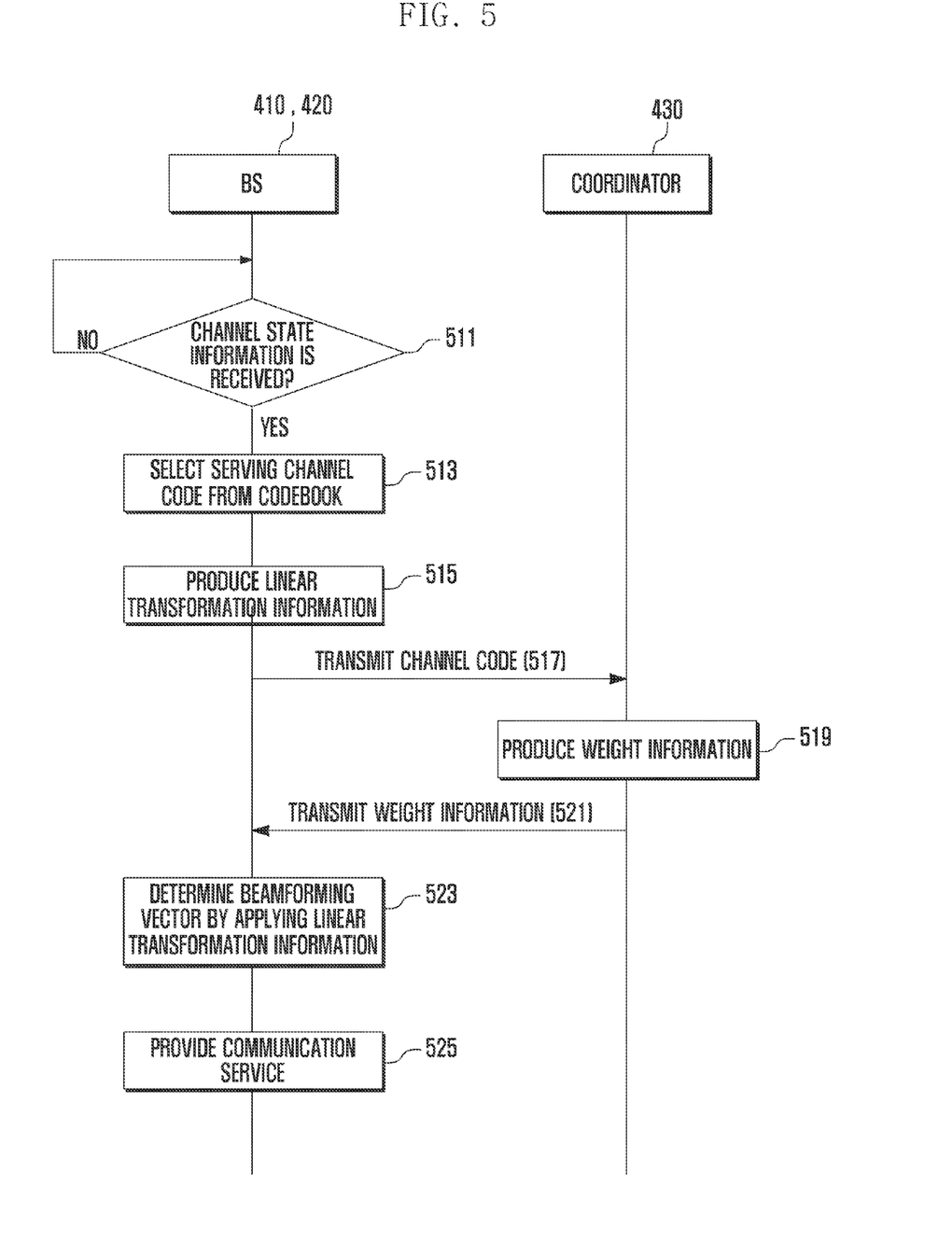
FIG. 5 is a flowchart illustrating the BS cooperation procedure according to another embodiment of the present invention.

FIG. 5 is a flowchart illustrating the BS cooperation procedure according to another embodiment of the present invention. In this embodiment, the BS cooperation procedure is performed through the communication between the BSs 410 and 420, and the BSs 410 and 420 operate in the same manner. Here, each of the BSs 410 and 420 operates as the serving BS and simultaneously as the cooperating BS.

Referring to FIG. 5, in the BS cooperation procedure of this embodiment, the BS first acquires the channel state information at step 511. At this time, the BS can acquire the channel state information using the sounding method or the analog feedback method. Here, the BS can acquire the channel state information in the form of analog signal. For example, the serving BS 410 can acquire $H_{CC}$ and $H_{CD}$ from the serving MS 411. The serving BS 410 also can acquire $H_{CC}$ from the serving MS 411 and $H_{DC}$ from the cooperating MS 421.

Upon receipt of the channel state information, the BS selects the serving channel code corresponding to the channel state information from the codebook at step 513. That is, the BS selects the channel code having the least difference to the channel state information among the channel codes of the codebook as the serving channel code. For example, the serving BS 410 can select $C_C$ corresponding to $H_C$. The cooperating BS 420 can select $C_D$ corresponding to $H_D$. At this time, the BSs 410 and 420 can select the serving channel code using equation (6):

$$C_i(m') = \min_{C_i(m') \in C} \|H_i - C(m)\|^2 \quad (6)$$

Here, m denotes the index of channel code, C(m) denotes the channel code corresponding to m, i denotes the index of the BS, $H_i$ denotes the channel state information, and $C_i(m')$ denotes the serving channel code. $H_i$ denotes the integrated channel state information in association with at least one MS that can communicate with the BS. For example, $H_i$ of the serving BS 410 can be $[H_{CC}{}^T H_{DC}{}^T]^9$ and $H_i$ of the cooperating BS 420 can be $[H_{CD}{}^T H_{DD}{}^T]^9$. Here, T denotes the transpose of matrix.

Next, the BS produces the linear transformation information using the channel state information and the serving channel code at step 515. At this time, the BS produces the linear transformation information to minimize the quantization loss between the channel state information and the channel code. At this time, the BS transforms the channel state information and the serving channel code linearly to produce the linear transformation as equation (7). For example, the BS can produce the linear transformation information as equation (8). In this manner, the BS can quantize the channel state information into the serving channel code and check the quantization loss between the channel state information and the serving channel code with the linear transformation information.

$$F_i = \min \|H_i F_i - C_i(m' \epsilon_i\|^2 \quad (7)$$

Here, $F_i$ denotes the linear transformation information, $H_i$ denotes the channel state information, $C_i(m')$ denotes the serving channel code, and $\epsilon_i$ denotes the channel state information error.

$$F_i = (H_i{}^H H_i)^{-1} H_i{}^H \cdot C_i(m') \quad (8)$$

Here, $N_T$ denotes a number of transmit antennas of the BS, and $N_R$ denotes a number of receive antennas of the MS.

Next, the BS transmits the serving channel code to the coordinator 430 at step 517. If the channel codes are received form the BSs 410 and 420, the coordinator 430 produces the weight information per BS at step 519. For example, the coordinator 430 can receive $C_C$ corresponding to $H_C$ from the serving BS 410. The coordinator 430 als can receive the $C_D$ corresponding to $H_D$ from the cooperating bs 420. The coordinator 430 also produces the per-bs weight information using the channel codes of the BSs 410 and 420. For example, the coordinator 430 can produce the weight information using equation (9). The coordinator 430 transmits the per-bs weight to the BSs 410 and 420 at step 521.

$$[C_C \quad C_D]^{-1} = \begin{bmatrix} W_C \\ W_D \end{bmatrix} \quad (9)$$

Here, $W_A$ denotes the serving weight information, and $W_B$ denotes the cooperating weight information.

If the weight information is received, the BS applies the linear transformation information to the weight information to determine the beamforming vector at step 523. That is, the BS produces the finally weight information by applying the second linear transformation to the weight information. At this time, the base station can produce the final weight information using equation (10). The BS determines the beamforming vector using the final weight information. Next, the BS provides the MSs 411 and 421 with the communication service using the beamforming vector. In this manner, the BS can recover the quantization loss between the channel state information and the channel code.

$$W_i' = F_i \times W_i \quad (10)$$

Here, $W_i$ denotes the serving weight information, $F_i$ denotes the linear transformation information, and $W_i'$ denotes the final weight information.

According to the present invention, the BS cooperation system is capable of producing the linear transformation information that is capable of minimizing the quantization loss between the channel state information and the channel code. The base station applies the linear transformation to beamforming for providing the communication service so as to recover the quantization loss. This improves the cooperation performance in the BS cooperation system.

The embodiments disclosed in the specification and drawings aim only to help understand but not limit the present invention. Meanwhile, persons ordinarily skilled in the art would make modifications in terms of specific embodiments and application scopes without departing from the concepts of the present invention.

What is claimed is:

1. A base station cooperation method for providing a plurality of mobile stations with communication service through a plurality of base stations, the base station cooperation method comprising:
    selecting, at a serving base station when channel state information of a mobile station is acquired, a serving channel code corresponding to the channel state information from a codebook;
    producing transformation information using the serving channel code and the channel state information;
    producing, when a cooperating channel code is received from a cooperating base station, serving weight information of the serving base station and cooperating weight information of the cooperating base station using the serving channel code and the cooperating channel code; and
    determining a beamforming vector by applying the transformation information to the serving weight information.

2. The base station cooperation method of claim 1, wherein the codebook comprises a plurality of channel codes, and selecting a serving channel code from a codebook comprises selecting the channel code having the least difference to the channel state information among the channels codes using the following equation:

$$C_i(m') = \min_{C_i(m') \in C} \|H_i - C(m)\|^2$$

where m denotes the index of channel code, C(m) denotes the channel code corresponding to m, i denotes the index of the base station, $H_i$ denotes the channel state information, and $C_i(m')$ denotes the serving channel code.

3. The base station cooperation method of claim 1, wherein producing transformation information comprises producing the transformation information using the following equation to minimize quantization loss between the serving channel code and the channel state information:

$$F_i = \min \|H_i F_i - C_i(m') + \epsilon_i\|^2$$

where $F_i$ denotes the transformation information, $H_i$ denotes the channel state information, $C_i(m')$ denotes the serving channel code, and $\epsilon_i$ denotes channel state information error.

4. The base station cooperation method of claim 1, wherein determining a beamforming vector comprises producing a final weight information by applying the transformation information to the serving weight information as following equation and determining the beamforming vector using the final weight information:

$$W_i' = F_i \times W_i$$

where $W_i$ denotes the serving weight information, $F_i$ denotes the transformation information, and $W_i'$ denotes the final weight information.

5. The base station cooperation method of claim 1, further comprising transmitting the serving channel code from the serving base station to the cooperating base station.

6. A base station cooperation system for providing a plurality of mobile stations with communication service through a plurality of base stations, the base station cooperation system comprising:
    a serving base station which provides a mobile station with communication service; and
    at least one cooperating base station neighboring with the serving base station,
    wherein the serving base station comprises:
        a radio communication unit which acquires channel state information of the mobile station,
        a transformer which selects, when the channel state information is acquired, a serving channel code corresponding to the channel state information and produces transformation information using the serving channel code and the channel state information,
        a memory which stores a codebook having the serving channel code, and
        a control unit which transmits the serving channel code to the cooperating base station, producing, when cooperating channel code is received from the cooperating base station, serving weight information of the serving base station and cooperating weight information of the cooperating base station using the serving channel code and cooperating channel code and determines a beamforming vector by applying the transformation information to the serving weight information.

7. The base station cooperation system of claim 6, wherein the codebook comprises a plurality of channel codes, and the transformer selects the channel code having the least difference to the channel state information among the channels codes using the following equation:

$$C_i(m') = \min_{C_i(m') \in C} \|H_i - C(m)\|^2$$

where m denotes the index of channel code, C(m) denotes the channel code corresponding to m, i denotes the index of the base station, $H_i$ denotes the channel state information, and $C_i(m')$ denotes the serving channel code.

8. The base station cooperation system of claim 6, wherein the transformer produces the transformation information using the following equation to minimize quantization loss between the serving channel code and the channel state information:

$$F_i = \min \|H_i F_i - C_i(m') + \epsilon_i\|^2$$

where $F_i$ denotes the transformation information, $H_i$ denotes the channel state information, $C_i(m')$ denotes the serving channel code, and $\epsilon_i$ denotes channel state information error.

9. The base station cooperation system of claim 6, wherein the control unit produces a final weight information by applying the transformation information to the serving weight information as following equation and determines the beamforming vector using the final weight information:

$$W_i' = F_i \times W_i$$

where $W_i$ denotes the serving weight information, $F_i$ denotes the transformation information, and $W_i'$ denotes the final weight information.

10. A base station cooperation method for providing a plurality of mobile stations with communication service through a plurality of base stations, the base station cooperation method comprising:
  selecting, at a base station when channel state information of a mobile station is acquired, a channel code corresponding to the channel state information from a codebook;
  producing transformation information using the selected channel code and the channel state information;
  transmitting the selected channel code to a coordinator;
  transmitting, at the coordinator when the channel is received, weight information per base station produced using the received channel code to the base station; and
  determining, at the base station when the weight information is received, a beamforming vector by applying the transformation information to the weight information.

11. The base station cooperation method of claim 10, wherein the codebook comprises a plurality of channel codes, and selecting a channel code from a codebook comprises selecting the channel code having the least difference to the channel state information among the channels codes using the following equation:

$$C_i(m') = \min_{C_i(m') \in C} \|H_i - C(m)\|^2$$

where m denotes the index of channel code, C(m) denotes the channel code corresponding to m, i denotes the index of the base station, $H_i$ denotes the channel state information, and $C_i(m')$ denotes the serving channel code.

12. The base station cooperation method of claim 10, wherein producing transformation information comprises producing the transformation information using the following equation to minimize quantization loss between the serving channel code and the channel state information:

$$F_i = \min \|H_i F_i - C_i(m') + \epsilon_i\|^2$$

where $F_i$ denotes the transformation information, $H_i$ denotes the channel state information, $C_i(m')$ denotes the serving channel code, and $\epsilon_i$ denotes channel state information error.

13. The base station cooperation method of claim 10, wherein determining a beamforming vector comprises producing a final weight information by applying the transformation information to the serving weight information as following equation and determining the beamforming vector using the final weight information:

$$W_i' = F_i \times W_i$$

where $W_i$ denotes the serving weight information, $F_i$ denotes the transformation information, and $W_i'$ denotes the final weight information.

14. A base station cooperation system for providing a plurality of mobile stations with communication service through a plurality of base stations, the base station cooperation system comprising:
  a plurality of base stations which select, when channel state information of a mobile station, a channel code corresponding to the channel state information, produce transformation information using the selected channel code and the channel state information, and transmit the selected channel code; and
  a coordinator which produce, when the channel code is received from the base stations, weight information per base station using the channel code and transmits the weight information to corresponding base station,
  wherein the base station determines, when the weight information is received, a beamforming vector by applying the transformation information to the weight vector.

15. The base station cooperation system of claim 14, wherein the codebook comprises a plurality of channel codes, and the base station selects the channel code having the least difference to the channel state information among the channels codes using the following equation:

$$C_i(m') = \min_{C_i(m') \in C} \|H_i - C(m)\|^2$$

where m denotes the index of channel code, C(m) denotes the channel code corresponding to m, i denotes the index of the base station, $H_i$ denotes the channel state information, and $C_i(m')$ denotes the serving channel code.

16. The base station cooperation system of claim 14, wherein the base station produces the transformation information using the following equation to minimize quantization loss between the serving channel code and the channel state information:

$$F_i = \min \|H_i F_i - C_i(m') + \epsilon_i\|^2$$

where $F_i$ denotes the linear transformation information, $H_i$ denotes the channel state information, $C_i(m')$ denotes the serving channel code, and $\epsilon_i$ denotes channel state information error.

17. The base station cooperation system of claim 14, wherein the base station produces a final weight information by applying the transformation information to the serving weight information as following equation and determines the beamforming vector using the final weight information:

$$W_i' = F_i \times W_i$$

where $W_i$ denotes the serving weight information, $F_i$ denotes the transformation information, and $W_i'$ denotes the final weight information.

* * * * *